United States Patent [19]

Matsui et al.

[11] Patent Number: 4,731,388

[45] Date of Patent: Mar. 15, 1988

[54] PROCESS FOR PRODUCING EXPANDABLE STYRENE-BASED POLYMER BEADS

[75] Inventors: Hiroshi Matsui; Naoto Taga; Shinya Ohgi, all of Mie, Japan

[73] Assignee: Mitsubishi Yuka Badische Co., Ltd., Yokkaichi, Japan

[21] Appl. No.: 4,487

[22] Filed: Jan. 20, 1987

[30] Foreign Application Priority Data

Jan. 23, 1986 [JP] Japan .................................. 61-12470
Feb. 12, 1986 [JP] Japan .................................. 61-26787

[51] Int. Cl.$^4$ .............................................. C08J 9/20
[52] U.S. Cl. ...................................... 521/56; 521/60; 521/139; 521/146
[58] Field of Search ................... 521/56, 60, 146, 139

[56] References Cited

U.S. PATENT DOCUMENTS

| | | | |
|---|---|---|---|
| 3,192,169 | 6/1965 | Doak ..................................... | 521/56 |
| 3,265,643 | 8/1966 | Hatano et al. ......................... | 521/56 |
| 3,359,220 | 12/1967 | Wright ................................... | 521/56 |
| 4,363,881 | 12/1982 | Smith ..................................... | 521/56 |

Primary Examiner—Morton Foelak
Attorney, Agent, or Firm—Oblon, Fisher, Spivak, McClelland & Maier

[57] ABSTRACT

A process for producing expandable styrene-based polymer beads is disclosed, which comprises adding a low temperature polymerization initiator that is decomposable to the half at a temperature of from 50° to 80° C. for a period of 10 hours to an aqueous medium having suspended therein blowing agent-containing expandable styrene-based polymer small particles whose particle sizes have been adjusted so as to have a particle size distribution falling within a mean particle size ±20% in a proportion of at least ½ the amount required for polymerization of a styrene-based monomer to be added to the system, adding a blowing agent to the system in an amount enough to inhibit expansion of said expandable styrene-based polymer small particles while the system is heated to a temperature for first stage polymerization, continuously or intermittently adding thereto a styrene-based monomer to which the rest, if any, of said low temperature polymerization initiator and a high temperature polymerization initiator that is decomposable to the half at a temperature of from 80° to 120° C. for a period of 10 hours have been added, adding a blowing agent to the polymerization system in an amount required for desired expansion of the resulting expandable styrene-based polymer beads, effecting first stage polymerization at a temperature ranging from a temperature 10° C. lower than the decomposition temperature of said low temperature polymerization initiator for obtaining a half-life of 10 hours to a temperature 20° C. higher than said decomposition temperature, and subsequently effecting second stage polymerization at an elevated temperature of from 100° to 150° C.

The process makes an effective use of expandable styrene-based polymer small particles obtained by suspension polymerization in the presence of a blowing agent whose particle size is unsuitable for use as expandable beads. The resulting expandable styrene-based polymer beads have a desired particle size with a narrow particle size distribution.

10 Claims, 1 Drawing Figure

U.S. Patent   Mar. 15, 1988   4,731,388
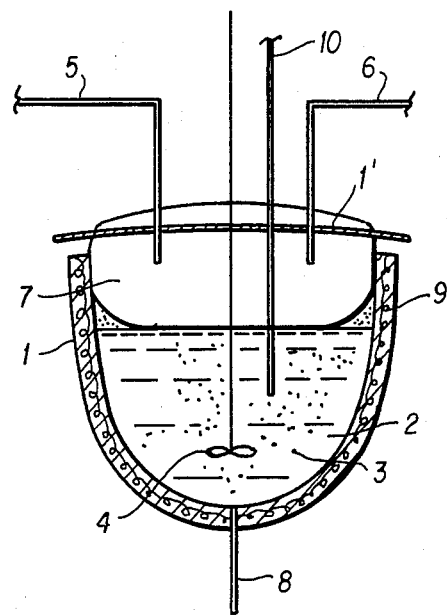

PROCESS FOR PRODUCING EXPANDABLE STYRENE-BASED POLYMER BEADS

FIELD OF THE INVENTION

This invention relates to a process for producing expandable styrene-based polymer beads having narrow particle size distribution with industrial advantages. More particularly, it relates to a process for producing expandable styrene-based polymer beads having a desired particle size and a narrow particle size distribution, which process does not include suspension polymerization of styrene-based monomers in the absence of a blowing agent but, instead, utilizes expandable styrene-based polymer particles obtained by suspension polymerization in the presence of a blowing agent as seed particles.

BACKGROUND OF THE INVENTION

Conventional processes for producing expandable styrene-based polymer beads are roughly classified into a process comprising impregnating a blowing agent into styrene-based polymer beads previously prepared by suspension polymerization and a process comprising suspension polymerization of styrene-based monomers in the presence of a blowing agent to produce particulate polymers containing the blowing agent.

The first process requires preparation of styrene-based polymer particles by suspension polymerization in advance. Since the styrene-based polymer particles obtained by suspension polymerization have a continuous broad particle size distribution of from small to large particles, they should be sieved to obtain a fraction having a desired narrow particle size distribution, which is then impregnated with a blowing agent. Therefore, this process involves an increased number of production steps, i.e., the suspension polymerization step, the sieving step, and the blowing agent impregnation step.

On the other hand, the second process does not involve one of the previous suspension polymerization for obtaining styrene-based polymer particles and the impregnation of a blowing agent and thus has an advantage of a smaller number of steps required. However, since the blowing agent is impregnated into all the produced polymer particles having a broad particle size distribution, there is a great problem on handling of the blowing agent-containing particles having particle sizes unsuitable for use as expandable beads. More specifically, of the expandable particles containing the blowing agent as produced by the second process, those having a particle size in the range of from 0.5 to 2.0 mm are most generally employed as expandable beads and are put on the market as on-specification materials, while those having particle sizes out of the above range can find almost no market. The incidental production of off-specification particles has been a chief cause of increasing the production cost of the expandable styrene-based polymer beads according to the second process.

In an attempt of overcoming the disadvantages of the aforesaid first and second processes, there has been proposed a process for producing expandable styrene-based polymer beads having a narrow particle size distribution, which comprises suspending classified small particles of a styrene-based polymer containing no blowing agent in an aqueous medium, quantitatively adding a styrene-based monomer having dissolved therein a polymerization initiator to the suspension system, conducting suspension polymerization until the polymer particles grow to a desired particle size, and then impregnating a blowing agent into the particles to thereby obtain expandable styrene-based polymer beads having a narrow particle size distribution, as disclosed in British Patent No. 1,255,237, West German Patent No. 1,917,090, Canadian Pat. No. 890,463 or French Patent No. 2,005,711 each corresponding to Japanese Patent Publication No. 2987/71. This improved process can produce expandable styrene-based polymer particles having a considerably narrow particle size distribution as compared with the conventional processes. Nevertheless, there still is a disadvantage that fine powdery polymer particles are produced in a proportion less than about 10%. Further, since this process starts with styrene-based polymer particles containing no blowing agent which are prepared by suspension polymerization followed by classification, the number of steps required is so increased.

Taking into consideration the advantages of the above-described second process in terms of number of steps involved, it would promise great benefit upon the industry to develop a process for converting the blowing agent-containing small particles, particularly those having a particle size less than 0.5 mm, that are unsuitable for use as expandable beads as obtained by the second process into particles having a size permitting of a use as expandable beads, e.g., of from 0.5 to 2.0 mm.

SUMMARY OF THE INVENTION

One object of this invention is to provide a process for producing expandable styrene-based polymer beads having a suitable particle size with a narrow distribution starting with blowing agent-containing expandable styrene-based polymer particles having a small particle size unsuitable for use as expandable beads.

As a result of extensive investigations, it has now been found that the above object can be accomplished by a process comprising suspending blowing agent-containing expandable styrene-based polymer small particles whose particle size is too small for use as expandable styrene-based polymer beads and whose particle size distribution has been adjusted within a given range in an aqueous medium in a polymerization vessel, supplying a part of a blowing agent, preferably in the form of a gaseous phase, to the reaction vessel to pressurize the reaction system to thereby prevent the expandable styrene-based polymer small particles from expanding, adding a styrene-based monomer to the system, and polymerizing the monomer in two stages of low temperature and high temperature in the presence of a blowing agent separately supplied, while using a specific low temperature polymerization initiator and a specific high temperature polymerization initiator under specific conditions.

That is, the present invention relates to a process for producing expandable styrene-based polymer beads, which comprises adding a low temperature polymerization initiator that is decomposable to the half at a temperature of from 50° to 80° C. for a period of 10 hours to an aqueous medium having suspended therein blowing agent-containing expandable styrene-based polymer small particles whose particle sizes have been adjusted so as to have a particle size distribution falling within a mean particle size ±20% in a proportion of at least ½ (up to 100%) the amount required for polymerization of a styrene-based monomer to be added to the system, adding a blowing agent to the system in an amount enough to inhibit expansion of said expandable styrene-based polymer small particles while the system is heated to a temperature for first stage polymerization, continuously or intermittently adding thereto a styrene-based monomer to which the rest, if any, of said low temperature polymerization initiator and a high temperature polymerization initiator that is decomposable to the half at a temperature of from 80° to 120° C. for a period of 10 hours have been added, adding a blowing agent to the polymerization system in an amount required for desired expansion of the resulting expandable styrene-based polymer beads, effecting first stage polymerization at a temperature ranging from a temperature 10° C. lower than the decomposition temperature of said low temperature polymerization initiator for obtaining a half-life of 10 hours to a temperature 20° C. higher than said decomposition temperature, and subsequently effecting second stage polymerization at an elevated temperature of from 100° to 150° C.

In a preferred embodiment of this invention, the blowing agent of the amount enough to inhibit expansion of the initially added expandable styrene-based polymer small particles is added in the form of gas to the space of a polymerization vessel during the stage of temperature elevation for the first stage polymerization.

According to the process of the present invention, expandable styrene-based polymer beads having such a narrow particle size distribution that 98% by weight or more of the produced particles falls within a desired size range, e.g., of from 0.5 to 2.0 mm, can be produced easily with a markedly reduced production ratio of undesirably fine particles by using expandable styrene-based polymer particles containing a blowing agent which are unsuitable for use as expandable styrene-based polymer beads and whose particle sizes have been adjusted to a certain range.

BRIEF DESCRIPTION OF THE DRAWING

Drawing is a schematic cross-section of a polymerization vessel used in examples and comparative examples of this invention.

DETAILED DESCRIPTION OF THE INVENTION

The small particles of the blowing agent-containing expandable styrene-based polymer which can be used as seed particles in the present invention should be smaller than the desired expandable styrene-based polymer beads as having a particle size of, for example, 0.5 mm or even smaller, and be adjusted so as to have a narrow particle size distribution falling within a mean particle size ±20%. If the particle size distribution of the seed particles is broader than the above range, the resulting expandable styrene-based polymer particles would have a so undesirably broad particle size distribution. Such small particles of expandable styrene-based polymer containing a blowing agent may be obtained by classification of the expandable styrene-based polymer particles as produced by the aforementioned second conventional process as well as any other processes such as the process of the present invention, etc.

The polymerization initiator to be used in the present invention comprises a combination of low temperature polymerization initiators whose decomposition temperature for obtaining a half-life of 10 hours ranges from 50° to 80° C. and high temperature polymerization initiators whose decomposition temperature for obtaining a half-life of 10 hours ranges from 80° to 120° C.

The low temperature polymerization initiators include those soluble in styrene-based monomers, such as lauroyl peroxide (decomposition temperature for obtaining a half-life of 10 hours, hereinafter the same=62° C.), azobisisobutyronitrile (63° C.), t-butyl peroxy-2-ethylhexanoate (72.5° C.), benzoyl peroxide (74° C.), and the like.

The low temperature polymerization initiator is first added to the reaction system in an amount of from 50 to 100%, and preferably from 85 to 100%, based on the amount required for polymerization of a styrene-based monomer, and the rest, if any, is added to the system as an admixture with a styrene-based monomer. The low temperature polymerization initiator may be either liquid or powderous, with the latter being preferred. When a liquid low temperature polymerization initiator is used, it is desirable to stir the aqueous medium during the addition and immediately disperse the system to form an emulsion because the liquid polymerization initiator, when added without stirring, dissolves the styrene-based polymer particles suspended in the medium to form agglomerates.

The high temperature polymerization initiators to be used are those soluble in styrene-based monomers, such as cyclohexanone peroxide (97° C.), t-butyl peroxybenzoate (104° C.), dicumyl peroxide (117° C.), and the like. These high temperature polymerization initiators are supplied to the polymerization system as an admixture with a styrene-based monomer.

Both the low and high temperature polymerization initiators may be used individually or in combination of two or more thereof, respectively. The amount of the low temperature polymerization initiator(s) to be used ranges from 0.01 to 1.0%, and preferably from 0.1 to 0.6%, by weight based on the styrene-based monomer (that is, styrene or a monomer mixture mainly comprising styrene). The amount of the high temperature polymerization initiator(s) to be used ranges from 0.01 to 1.0%, and preferably from 0.05 to 0.5%, by weight on the same basis. If the amount of the low temperature polymerization initiator to be added to the aqueous medium is less than ½ the amount required for polymerization of the styrene-based monomer, the production proportion of expandable polymer particles finer than expected becomes large. The amount of the polymerization initiator required for polymerization of the styrene-based monomer is appropriately selected from the above-recited range so that the resulting expandable particles may have a molecular weight most suitable for expansion moldability, the desired degree of expansion, and the like.

The blowing agent to be added to the reaction system is divided into two portions; one added during temperature elevation for the first stage polymerization in the form either of liquid or gas (the gaseous form is preferred) in such an amount enough to inhibit expansion of the expandable styrene-based polymer small particles suspended in the medium; and the other added in the form of liquid after addition of the styrene-based monomer in such an amount required for expansion of the finally produced expandable styrene-based polymer particles.

The addition of the first portion of the blowing agent aims to maintain the pressure of the polymerization reaction system at a level equal to or higher than the partial pressure of the blowing agent present in the expandable styrene-based polymer small particles suspended in the aqueous medium to thereby prevent the expandable small particles from expansion through elevation of temperature. In cases of using a liquid blowing agent, its amount ranges from 5 to 15% by weight based on the suspended small particles. On the other hand, in cases of feeding the gaseous blowing agent to the gaseous phase of the reaction system, its amount to be fed ranges from 3 to 15 g per liter of the space (gaseous phase) of the reaction vessel. If the amount of the blowing agent to be added as the first portion is too small, the expandable small particles suspended in the aqueous medium cannot be prevented from expansion induced by temperature rise for suspension polymerization. As a result, the reaction system undergoes coagulation during polymerization, failing to obtain expandable styrene-based polymer beads. To the contrary, excessive amounts of the blowing agent cause formation of agglomerates or fine particles. From theoretical considerations, the liquid or gaseous blowing agent is added to the polymerization vessel by the time when the temperature of the system reaches a glass transition temperature (Tg) of the polymer of the expandable styrene-based polymer particles. The Tg of a styrene homopolymer is 103° C., while an apparent Tg decreases in proportion to the content of the blowing agent contained therein. In carrying out the present invention, therefore, the first portion of the blowing agent is added in the course of temperature elevation for the first stage polymerization, and preferably at the point when the temperature of the polymerization system reaches a range of from about 40° to about 60° C.

Addition of the gaseous blowing agent to the space of the polymerization vessel is preferred to addition of the liquid blowing agent not only because the production ratio of fine powdery polymer particles can be decreased but also because adhesion of the produced polymer onto inner walls of the vessel can be reduced.

The rest of the blowing agent, i.e., the second portion, is added to the polymerization system at an appropriate stage after addition of a styrene-based monomer, i.e., from before the commencement of the first stage polymerization reaction to the initial stage of the second stage polymerization reaction. The amount of the blowing agent to be added here is determined so that the finally obtained expandable styrene-based polymer beads contain from 2 to 10% by weight of the blowing agent.

Various kinds of blowing agents can be used throughout the process of the present invention. The blowing agent present in the seed styrene-based polymer particles, that added to the system as the first portion, and that added as the second portion may be the same or different from each other. Specific examples of usable blowing agents include aliphatic hydrocarbons, e.g., propane, butane, pentane, etc.; alicyclic hydrocarbons, e.g., cyclobutane, cyclopentane, etc.; halogenated hydrocarbons, e.g., methyl chloride, dichlorodifluoromethane, etc.; and so on.

The styrene-based monomers which can be used in this invention include styrene monomer as well as monomer mixtures comprising styrene as a main component and small proportions of copolymerizable monomers. Examples of the copolymerizable monomers are α-methylstyrene, divinylbenzene, acrylonitrile, esters of acrylic acid or methacrylic acid with alcohols having up to 8 carbon atoms (e.g., methyl methacrylate, ethyl acrylate, etc.), monomethyl maleate, monomethyl fumarate, dimethyl maleate, monoethyl itaconate, etc.

The blowing agent-containing expandable styrene-based polymer small particles are suspended in an aqueous medium with the aid of a suspension stabilizer. Examples of the suspension stabilizers to be used include organic compounds, e.g., polyvinylpyrrolidone, gelatin, carboxymethyl cellulose, a hydroxyalkyl cellulose, etc., and inorganic compounds, e.g., a calcium or magnesium salt of phosphoric acid or carbonic acid, etc., with the inorganic compounds being preferred. The most preferred among them is a combination of calcium tertiary phosphate and sodium dodecylbenzenesulfonate as an anionic surface active agent.

The present invention will now be illustrated in greater detail with reference to the following examples, comparative examples, and reference examples, but it should be understood that the present invention is not intended to be limited thereto. In these examples, all the percents are given by weight unless otherwide indicated.

EXAMPLE 1

In a 3 liter volume polymerization vessel were charged 1,000 g of pure water, 5.0 g of calcium tertiary phosphate, 2.0 g of a 1% aqueous solution of sodium dodecylbenzenesulfonate, 165 g of expandable styrene polymer particles containing 5.98% of butane as a blowing agent which had been adjusted to a particle size between 0.37 mm and 0.5 mm, and 3.3 g of benzoyl peroxide which corresponded to 100% based on the amount required for polymerization of a styrene monomer, and the mixture was stirred at 400 rpm to prepare a uniform dispersion.

The dispersion was heated up to 85° C. while stirring. When the temperature reached 40° C., liquid butane was fed thereto in an amount of 12.9 g which corresponded to 7.5% based on the expandable styrene polymer particles. When the temperature reached 85° C., the system was kept at that temperature for 7 hours. In the meantime, a solution of 1.65 g of t-butyl peroxy benzoate and 16.5 g of cyclohexane in 825 g of styrene monomer was continuously fed to the system at a rate of 168.63 g per hour over a period of 5 hours starting from the point when the temperature reached 85° C. After completion of the styrene solution feed, liquid butane was added thereto in an amount of 79 g which corresponded to 8% based on the total weight of the expandable styrene polymer particles and the styrene monomer. The polymerization system was then heated from 85° C. up to 110° C. over a period of 1.5 hours and kept at that temperature for 4 hours to complete the polymerization.

After completion of the polymerization, the reaction mixture was cooled, and water was removed therefrom. Drying of the residue gave expandable styrene polymer beads. The particle size distribution, appearance, and volatile content (content of the blowing agent) of the resulting expandable styrene polymer beads are shown in Table 1.

The expandable styrene polymer beads were steam pre-expanded at a temperature of 98° C. and at a steam pressure of 1.0 kg/cm². The density of the resulting pre-expanded beads is shown in Table 1. The pre-expanded styrene polymer beads were packed in a cavity of a mold (100 mm×100 mm×200 mm) and steam molded at a steam pressure of 0.7 kg/cm² for 20 seconds. The surface quality of the resulting expansion molded product is also shown in Table 1.

EXAMPLE 2

The procedure of Example 1 was repeated except that the expandable styrene polymer particles as seed particles contained 5.63% of pentane as a blowing agent and that instead of butane used as a blowing agent in Example 1 was used pentane in the same amount of that of butane in both the first and the second portions. The resulting expandable styrene polymer beads were pre-expanded and steam molded in the same manner as in Example 1, and evaluations were made in the same manner as in Example 1. The results obtained are shown in Table 1.

EXAMPLE 3

In a 3 liter volume polymerization vessel were charged 1,000 g of pure water, 5.0 g of calcium tertiary phosphate, 2.0 g of a 1% aqueous solution of sodium dodecylbenzenesulfonate, 300 g of expandable styrene polymer particles containing 5.44% of pentane as a blowing agent which had been adjusted to a particle size between 1.24 mm and 1.45 mm, and 2.4 g of benzoyl peroxide which corresponded to 100% based on the amount required for polymerization of a styrene monomer, and the mixture was stirred at 400 rpm to prepare a uniform suspension.

The suspension was heated up to 85° C. while stirring. In the meantime, when the temperature reached 40° C., liquid pentane was added thereto in an amount of 30 g which corresponded to 10% based on the expandable styrene polymer particles. When the temperature reached 85° C., the system was kept at that temperature for 5 hours. In the meantime, a solution of 1.2 g of t-butyl peroxy benzoate and 12.0 g of cyclohexane in 600 g of styrene monomer was continuously fed to the system at a rate of 153.3 g/hr over a period of 4 hours starting from the point when the temperature reached 85° C. After the addition of the styrene solution, the same procedure as in Example 1 was followed. The results obtained are shown in Table 1.

EXAMPLE 4

The procedure of Example 1 was repeated except that the expandable styrene polymer particles contained 2.18% of butane as a blowing agent and that the first portion of butane was added when the liquid temperature reached 60° C. The results obtained are shown in Table 1.

COMPARATIVE EXAMPLE 1

The procedure of Example 1 was repeated except that the first portion of the blowing agent was not added during temperature elevation. The expandable styrene polymer particles began to expand before the temperature of the system reached 85° C., and normal expandable styrene polymer beads could not be produced even by adding a styrene monomer.

COMPARATIVE EXAMPLE 2

The procedure of Example 1 was repeated except that the amount of the liquid butane to be added as the first portion was changed to 4.5% based on the expandable styrene polymer particles suspended in the system. Similarly to Comparative Example 1, the expandable styrene polymer particles began to expand before the temperature of the system reached 85° C., and normal expandable styrene polymer beads could not be obtained even if a styrene monomer was added.

REFERENCE EXAMPLE 1

The procedure of Example 1 was repeated except that no blowing agent was added after the addition of the styrene solution. Evaluations were made on the resulting expandable styrene polymer beads, pre-expanded beads, and expansion molded product in the same manner as in Example 1. The results are shown in Table 1 below.

TABLE 1

|  | Example | | | | Comparative Example | | Reference |
| --- | --- | --- | --- | --- | --- | --- | --- |
|  | 1 | 2 | 3 | 4 | 1 | 2 | Example 1 |
| Expandable Styrene Polymer Beads: Particle Size Distribution (%) | | | | | | | |
| >1.50 mm | 1.2 | 0.3 | 2.3 | 1.2 | Coagulation occurred | Coagulation occurred | 0.8 |
| 1.50~0.50 mm | 97.3 | 97.9 | 96.6 | 97.3 | | | 97.9 |
| <0.50 mm | 1.5 | 1.8 | 1.1 | 1.5 | | | 1.3 |
| Appearance | Normal | Normal | Normal | Normal | | | Normal |
| Volatile Content (%) | 6.3 | 6.8 | 5.9 | 4.1 | | | 1.8 |
| Density of Pre-Expanded Beads (g/l) | 19 | 18 | 22 | 42 | | | 85 |
| Surface Quality of Expansion Molded Product | Good | Good | Good | Good | | | Good |

EXAMPLE 5

The following procedure was performed using 3 liter volume polymerization vessel (1) having lid (1') shown in the accompanying drawing which was equipped with stirrer (4), pipe for feeding blowing agent (5), pipe for feeding styrene (6), drainage pipe (8), heating jacket (9) and thermometer (10). The vessel were charged with 1,000 g of pure water, 5.0 g of calcium tertiary phosphate, 2.0 g of a 1% aqueous solution of sodium dodecylbenzenesulfonate, 165 g of expandable styrene polymer particles (3) containing 6.13% of butane as a blowing agent which had been adjusted to a particle size between 0.37 mm and 0.5 mm, and 3.3 g of benzoyl peroxide which corresponded to 100% based on the amount required for polymerization of a styrene monomer, followed by stirring at 400 rpm to prepare uniform dispersion (2).

Dispersion (2) was heated, and when the temperature reached 40° C., gaseous butene was fed to space (7) of the vessel in an amount of 14 g which corresponded to 7.5 g per liter of the space through pipe (5). The heating was further continued up to a temperature of 85° C., at which the system was kept for 7 hours. In the meantime, a solution of 1.65 g of t-butyl peroxy benzoate and 16.5 g of cyclohexane in 825 g of styrene monomer was continuously added at a rate of 168.63 g/hr over a period of 5 hours from the time when the temperature of the system reached 85° C.

After the addition of the styrene solution, liquid butane was added to the polymerization system in an amount of 79 g which corresponded to 8% based on the total weight of the expandable styrene polymer particles and the styrene monomer. The reaction mixture was heated from 85° C. up to 110° C. over a period of 1.5 hours and kept at that temperature for 4 hours to complete the polymerization.

After completion of the polymerization, the reaction mixture was cooled, and water was removed therefrom. Drying of the residue gave expandable styrene polymer beads. Evaluations on the resulting beads were made in the same manner as in Example 1. Adhesion of the produced polymer onto the inner wall of the vessel was also examined. These results are shown in Table 2.

The resulting expandable styrene polymer beads were steam pre-expanded, and the pre-expanded beads were steam molded in the same manner as in Example 1. The density of the pre-expanded beads and surface quality of the molded product are also shown in Table 2.

temperature of the system reached 60° C. The results obtained are shown in Table 2.

COMPARATIVE EXAMPLE 3

The procedure of Example 5 was repeated except that the amount of the gaseous butane to be added as the first portion was changed to 4.6 g which corresponded to 2.5 g/l of the space of the vessel or to 2.75% of the expandable styrene polymer particles. In this case, the seed polymer particles began to expand before the temperature of the system reached the temperature for the first stage polymerization, resulting in coagulation of the reaction system. Even when a styrene monomer was added, normal expandable styrene polymer beads could not be obtained.

REFERENCE EXAMPLE 2

The procedure of Example 5 was repeated except that 825 g of styrene monomer was replaced with a monomer mixture comprising 6.19 g of styrene monomer and 206 g of methyl methacrylate to produce expandable styrene-based copolymer beads. The results obtained are shown in Table 2.

TABLE 2

|  | Example | | | | | Comparative | Reference |
|---|---|---|---|---|---|---|---|
|  | 5 | 6 | 7 | 8 | 9 | Example 3 | Example 2 |
| Expandable Styrene Polymer Beads: Particle Size Distribution (%) | | | | | | | |
| >1.50 mm | 0.8 | 1.3 | 0.7 | 1.0 | 0.5 | Coagulation occurred | 0.6 |
| 1.50~0.50 mm | 98.8 | 98.0 | 98.5 | 97.5 | 97.8 |  | 98.1 |
| <0.50 mm | 0.4 | 0.7 | 0.8 | 1.5 | 1.7 |  | 1.3 |
| Appearance | Normal | Normal | Normal | Normal | Normal |  | Normal |
| Volatile Content (%) | 6.3 | 5.8 | 6.7 | 6.5 | 4.8 |  | 5.5 |
| Adhesion of Polymer onto Inner Wall of Vessel | None | None | None | None | None |  | None |
| Density of Pre-Expanded Beads (g/l) | 17 | 19 | 16 | 16 | 28 |  | 18 |
| Surface Quality of Expansion Molded Product | Good | Good | Good | Good | Good |  | Good |

EXAMPLE 6

The procedure of Example 5 was repeated except that the amount of the gaseous butane to be added as the first portion was changed to 28 g which corresponded to 15 g per liter of the space of the vessel. The results obtained are shown in Table 2.

EXAMPLE 7

The procedure of Example 5 was repeated except that the amount of the gaseous butane to be added as the first portion was changed to 5.6 g which corresponded to 3 g per liter of the space of the vessel. The results obtained are shown in Table 2.

EXAMPLE 8

The procedure of Example 5 was repeated except that the starting expandable styrene polymer particles contained 5.74% of pentane as a blowing agent and that instead of butane used as a blowing agent in Example 5 was used pentane in the same amount as that of butane in both the first and the second portions. The results obtained are shown in Table 2.

EXAMPLE 9

The procedure of Example 5 was repeated except that expandable styrene polymer particles containing 2.38% of butane as a blowing agent were used and that the first portion of butane (7.5 g/l) was added when the

EXAMPLE 10

The procedure of Example 1 was repeated except that 3.3 g of the benzoyl peroxide was divided into a 2.97 g portion which corresponded to 90% based on the amount required for polymerization of a styrene monomer and a 0.33 g portion which corresponded to 10% based on the amount required for polymerization of a styrene monomer and the first portion was charged in the polymerization vessel, with the second portion being added to the styrene solution. The resulting expandable styrene polymer beads were pre-expanded and steam molded in the same manner as in Example 1, and evaluations were made in the same manner as in Example 1. Adhesion of the produced polymer onto the inner wall of the vessel was also examined. The results obtained are shown in Table 3.

EXAMPLE 11

The procedure of Example 1 was repeated except that 3.3 g of the benzoyl peroxide was divided into a 1.82 g portion which corresponded to 55% based on the amount required for polymerization of a styrene monomer and a 1.48 g portion which corresponded to 45% based on the amount required for polymerization of a styrene monomer and the first portion was charged in the polymerization vessel, with the second portion being added to the styrene solution. The resulting expandable styrene polymer beads were pre-expanded and steam molded in the same manner as in Example 1, and evaluations were made in the same manner as in Example 1. Adhesion of the produced polymer onto the inner wall of the vessel was also examined. The results obtained are shown in Table 3.

TABLE 3

|  | Example 10 | Example 11 |
|---|---|---|
| Expandable Styrene Polymer Beads: Particle Size Distribution (%) | | |
| >1.50 mm | 1.8 | 2.3 |
| 1.50~0.50 mm | 95.5 | 93.4 |
| <0.50 mm | 2.7 | 4.3 |
| Appearance | Normal | Normal |
| Volatile Content (%) | 6.5 | 6.4 |
| Adhesion of Polymer onto Inner Wall of Vessel | Observed | Observed |
| Density of Pre-Expanded Beads (g/l) | 16 | 17 |
| Surface Quality of Expansion Molded Product | Good | Good |

As described above, the process of the present invention makes it possible to easily produce excellent expandable styrene-based polymer beads having a desired particle size with a narrow particle size distribution by utilizing expandable styrene-based polymer particles unsuitable for use as expandable styrene-based polymer beads that are produced by the conventional process comprising suspension polymerization of a styrene-based monomer in the presence of a blowing agent (i.e., the aforesaid second process). Thus, the above-described second conventional process can be carried out with great industrial advantages.

While the invention has been described in detail and with reference to specific embodiments thereof, it will be apparent to one skilled in the art that various changes and modifications can be made therein without departing from the spirit and scope thereof.

What is claimed is:

1. A process for producing expandable styrene-based polymer beads, which comprises adding a low temperature polymerization initiator that is decomposable to the half at a temperature of from 50° to 80° C. for a period of 10 hours to an aqueous medium having suspended therein blowing agent-containing expandable styrene-based polymer small particles whose particle sizes have been adjusted so as to have a particle size distribution falling within a mean particle size ±20% in a proportion of at least ½ the amount required for polymerization of a styrene-based monomer to be added to the system, adding a blowing agent to the system in an amount of 5 to 15% by weight based on the small particles enough to inhibit expansion of said expandable styrene-based polymer small particles while the system is heated to a temperature for first stage polymerization, continuously or intermittently adding thereto a styrene-based monomer to which the rest, if any, of said low temperature polymerization initiator and a high temperature polymerization initiator that is decomposable to the half at a temperature of from 80° to 120° C. for a period of 10 hours have been added, adding a blowing agent to the polymerization system in an amount required for desired expansion of the resulting expandable styrene-based polymer beads, effecting first stage polymerization at a temperature ranging from a temperature 10° C. lower than the decomposition temperature of said low temperature polymerization initiator for obtaining a half-life of 10 hours to a temperature 20° C. higher than said decomposition temperature, and subsequently effecting second stage polymerization at an elevated temperature of from 100° to 150° C.

2. A process as in claim 1, wherein said blowing agent of the amount enough to inhibit expansion of the expandable styrene-based polymer small particles is added when the temperature of the system is between 40° C. and 60° C.

3. A process as in claim 1, wherein the amount of the blowing agent required for desired expansion of the resulting expandable styrene-based polymer beads is such that the resulting expandable styrene-based polymer beads contain from 2 to 10% by weight of the blowing agent.

4. A process as in claim 1, wherein said blowing agent of the amount enough to inhibit expansion of the expandable styrene-based polymer small particles is added in a gaseous form to the space of a polymerization vessel.

5. A process as in claim 4, wherein said amount of the blowing agent enough to inhibit expansion of the expandable styrene-based polymer small particles is from 3 to 15 g per liter of the space of the polymerization vessel.

6. A process as in claim 4, wherein said blowing agent of the amount enough to inhibit expansion of the expandable styrene-based polymer small particles is added when the temperature of the system is between 40° C. and 60° C.

7. A process as in claim 4, wherein the amount of the blowing agent required for desired expansion of the resulting expandable styrene-based polymer beads is such that the resulting expandable styrene-based polymer beads contain from 2 to 10% by weight of the blowing agent.

8. A process as in claim 1, wherein the proportion of the initially added low temperature polymerization initiator in the amount required for polymerization of the styrene-based monomer is from 85 to 100%.

9. A process as in claim 1, wherein said low temperature polymerization initiator is benzoyl peroxide.

10. A process as in claim 1, wherein said high temperature polymerization initiator is t-butyl peroxybenzoate.

* * * * *